United States Patent [19]

Jessup

[11] 4,217,616
[45] Aug. 12, 1980

[54] MOTOR OVERLOAD PROTECTION CIRCUIT

[75] Inventor: Frank L. Jessup, New Whiteland, Ind.

[73] Assignee: John Fulling, Greenwood, Ind.

[21] Appl. No.: 914,555

[22] Filed: Jun. 12, 1978

[51] Int. Cl.² ............................................ H02H 7/085
[52] U.S. Cl. ........................................ 361/31; 361/94; 361/100; 307/252 B; 307/311; 318/474
[58] Field of Search ................... 361/31, 23, 24, 30, 361/94, 93, 100; 307/252 B, 252 C, 252 J, 311; 318/474

[56] References Cited

U.S. PATENT DOCUMENTS

| | | | |
|---|---|---|---|
| 3,416,035 | 12/1968 | Lipnitz | 361/94 X |
| 3,535,592 | 10/1970 | Roveti | 361/100 |
| 3,564,337 | 2/1971 | MacGeorge | 361/31 X |
| 3,696,288 | 10/1972 | Carman | 361/31 X |
| 3,857,077 | 12/1974 | Kasmer | 307/252 B X |
| 3,940,634 | 2/1976 | Grogan | 307/252 B X |
| 4,052,625 | 10/1977 | Cameron | 361/23 X |
| 4,061,961 | 12/1977 | Baker | 361/100 X |
| 4,090,107 | 5/1978 | Seib | 307/311 X |
| 4,123,792 | 10/1978 | Gephart et al. | 361/30 |

*Primary Examiner*—Patrick R. Salce
*Attorney, Agent, or Firm*—Gust, Irish, Jeffers & Hoffman

[57] ABSTRACT

Motor overload current is sensed and coupled to the input of an operational amplifier, causing the amplifier output to invert and charge a plurality of parallel connected capacitors. When the overload condition is present for a predetermined time, the capacitors are sufficiently charged to change the output state of a second operational amplifier. A diode is coupled between the output and the input of the second amplifier and is poled to latch the second amplifier into its inverted state when the capacitors have reached the predetermined charge. A luminous source, such as a light emitting diode, is coupled to the output of the second amplifier and becomes non-luminous in the inverted state of the second amplifier. The diode is photo-coupled to a photo conductive circuit for disabling the power coupling to the motor circuit when the diode is non-luminous.

5 Claims, 1 Drawing Figure

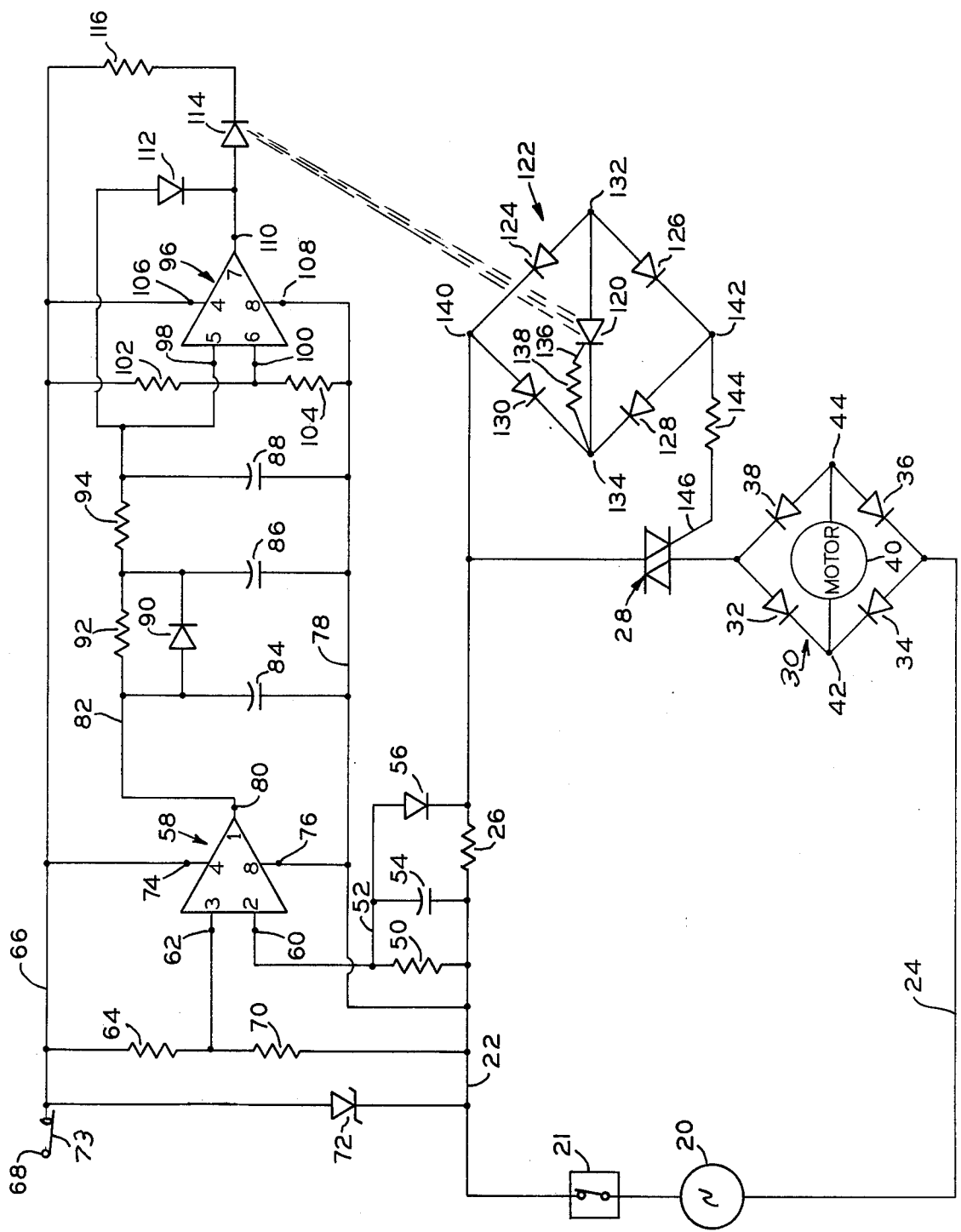

MOTOR OVERLOAD PROTECTION CIRCUIT

BACKGROUND OF THE INVENTION

1. Field of the Invention

This invention is in the field of motor overload protection circuits and more particularly to circuits used for protecting motors used for door opening and the like.

2. Description of the Prior Art

Motors have been used for many years to open doors of commercial establishment, and especially the larger doors such as garage doors and large commercial building doors at loading docks, warehouses, airports, truck entrances and the like. Frequently, the doors are provided with automatic opening devices which are responsive to a predetermined weight present on a pressure sensitive mat or other member in the door entryway. If the pressure sensitive mat is actuated, and the door is locked or otherwise unable to open, power is supplied to the motor but the motor is unable to operate, becomes stalled and overloaded, causing motor damage, gear drive train damage, and door stress.

Previous efforts to protect a motor against overload conditions have included thermal circuit breakers, fuses, and timer circuits which automatically turn the motor off within that time which it normally takes to open or close the door. However, these devices have deficiencies which are inherent in their operation resulting in limited use thereof. In thermal circuit breakers, once the circuit breaker reaches a circuit breaking temperature, it tends to open and close the circuit intermittently as the temperature rises and falls below the breaking temperature. In fuses, the sensitivity is limited and is susceptible to very short, transient, temporary, momentary periods of motor overload current that will cause the fuse to open before a true overload condition exists. The timing circuits that automatically turn the motor off after a predetermined time do not protect the motor during that predetermined time, during which motor damage can easily occur, and the timing period may be inadvertently restarted thus extending the time during which motor overload may continue.

SUMMARY OF THE INVENTION

A conventional AC power source is rectified to drive a standard direct current motor. A drive train is coupled between the motor and a door to open the door during motor operation. A small sampling resistor is placed in one of the power lines and the voltage across the resistor is rectified, filtered and supplied to the inverting terminal of an operational amplifier. The output of the amplifier is coupled to first plates of three capacitors connected in parallel, the second plates of which are connected to a common potential. When an overload current is sensed by the sampling resistor, the amplifier output is inverted charging the first plates of the capacitors. A diode and resistor are connected across the first plates of the first and second capacitors, with the diode being poled to conduct in a discharge direction. An isolation resistance is connected between the first plates of the second and third capacitors, with the third capacitor first plate being coupled to the inverting terminal of a second operational amplifier, the output of which energizes a photo device, such as a light emitting diode, when in the non-inverted state. A diode is connected in feed back relation between the output of the second operational amplifier and the inverting terminal and is poled to conduct when the amplifier is in the inverted stage, thus latching the amplifier in the inverted condition and deenergizing the photo device. The isolation resistance prevents a rapid discharge of the first plate of the third capacitor, which is also coupled to the inverting terminal of the second amplifier, in order to provide time to establish the feedback latching connection.

The photo device is photo-coupled to a photo conductive device in the preferred embodiment comprising a photo silicon controlled rectifier in a diode bridge circuit, which provides a trigger potential to the gate of a power triac in the motor supply circuit. When the photo device is luminous, the rectifier is conducting providing trigger potential to the triac gate to close the supply circuit to the motor. However, when the photo device is in its non-luminous state, the rectifier no longer conducts and the triac is turned "off", opening the supply circuit to the motor.

The capacitor circuit between the two operational amplifiers is designed, in the preferred embodiment, so that the overload condition must exist for one second before the first plate of the third capacitor has a sufficient charge to cause the second amplifier output to invert to result in opening of the supply circuit to the motor. Thus, momentary overloads, which would be caused by uneven but temporary resistance or blockage of the door opening sequence or cycle, would not serve to open the motor circuit. This provides a considerable advantage since temporary overload conditions would not cause damage to the motor or motor drive train and therefore motor stoppage is not necessary or desired. Further, the capacitor circuit is provided with rapid discharge of the first plates of the first two capacitors through the diode connecting the first plates and through the first operational amplifier so that a series of closely spaced temporary stoppages or transients in the power circuit will not cause an accumulation of charge in the capacitor circuit to stop motor operation. However, once the overload condition has existed for one second, the motor is stopped and is latched in a stopped position even though the overload after that period of time is removed. This is desirable since it has been found that any overload condition that has existed for one second, or other desired predetermined time, indicates a fault in door, drive train, or motor operation which requires correction even though it is temporarily relieved after that period of time. The circuit remains latched until reset, as by removing power to the circuit. The control circuit of this invention does not require any moving parts, is highly reliable in operation, has superior sensitivity to the amount and length of overload condition, and is inexpensive in manufacture and maintenance.

Therefore, it is an object of this invention to provide a motor overload protection circuit which is low in cost of manufacture and maintenance, reliable in operation, with superior sensitivity of overload amplitude and duration.

Another object of this invention is to provide in a device of the previous object a circuit which has no mechanical or moving parts, has a minimum of components, and utilizes a charing circuit having an accurately controlled charge time and a rapid discharge time.

A further object of this invention is to provide in a device of the previous objects a circuit which latches in an overload condition after such condition is sensed even though the overload condition is temporarily relieved.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWING

The FIGURE in the drawing is a schematic circuit diagram of a preferred embodiment of this invention.

DESCRIPTION OF THE PREFERRED EMBODIMENT

Referring to the drawing, a conventional 120 volt AC power source 20 is applied between lines 22, 24 through circuit breaker 21. A sampling resistor 26 is coupled in line 26 between source 20 and one terminal of power triac 28. The other terminal of triac 28 is coupled to a conventional diode bridge circuit 30 having four diodes 32, 34, 36 and 38 connected in the legs thereof in conventional manner and a conventional DC motor 40 diagonally coupled between opposite corners 42, 44 of the bridge. Line 24 is connected to the other side of bridge 30, thus providing a rectified DC voltage to motor 40 in conventional manner. The output shaft of motor 40 is coupled through a drive train, not shown, to open or operate a door or other member not shown, during motor operation. In a particular application, motor 40 is designed to open a door, such as a garage door, or a loading door to a commercial building, with a door spring being wound or compressed as an aid in closing of the door. The circuit of this invention senses and protects motor 40 against a overload current of predetermined magnitude and duration.

Resistance 50 is connected between line 22 and line 52, capacitance 54 is connected between line 52 and line 22 on one side of resistor 26, and diode 56 has its anode connected to line 52 and its cathode connected to line 22 on the other side of resistance 26.

Operational amplifier 58 has an input non-inverting terminal 60 and an input inverting terminal 62. In this discussion, terminal 60 will at times be characterized as the plus terminal and terminal 62 will be referred to as the minus terminal. Terminal 60, which is pin 2 of amplifier 58, is coupled to line 52 and terminal 62, which is pin 3 of amplifier 58, is coupled through voltage divider resistance 64 to line 66, supplied with a minus 15 volts DC from terminal 68 from a transformer tap or other convenient source. Input terminal 62 is also connected through a voltage divider resistance 70 to line 22. A zener diode 72 has its anode connected to line 66 and its cathode connected to line 22, and has a breakdown voltage of 15 volts thus regulating the voltage on line 66.

Pin 4 of amplifier 58 is connected to terminal 74 which is coupled to line 66 and pin 8 is connected to terminal 76 which is coupled to line 78, in turn connected to line 22, and having a "common" voltage, or that voltage present in line 22, therein. Output terminal 80, connected to pin 1 of amplifier 58, is coupled to line 82 to which are connected first plates of capacitors 84, 86, and 88. The second plates of capacitors 84, 86, and 88 are coupled to line 78. Diode 90 has its anode connected to the first plate of capacitor 84 and its cathode connected to the first plate of capacitor 86. Time constant resistance 92 is connected across diode 90 and is selected to provide the desired charging rate of capacitors 88. Isolation resistance 94 is connected between the first plates of capacitors 86 and 88, and, as will become apparent, performs an isolation function.

A second operational amplifier 96, has a non-inverting input 98, which is pin 5 of amplifier 96, and an inverting input 100, connected to pin 6 of amplifier 96. Input 100 is coupled through voltage dividing resistance 102 to line 66 and voltage dividing resistance 104 to line 78. Pin 4 of amplifier 96 is connected to terminal 106 coupled to line 66 and pin 8 of amplifier 96 is connected to terminal 108, which is coupled to line 78. Pin 7 of amplifier 96 is connected to output terminal 110 which is coupled to the cathode of diode 112, the anode of which is coupled to the non-inverting or plus terminal 98 of amplifier 96. Also, output 110 is coupled to the anode of diode 114, the cathode of which is coupled through resistance 116 to line 66.

In the operation of amplifiers 58 and 96, when a predetermined voltage change occurs at the non-inverting inputs 60 and 98 respectively, the voltage at outputs 80 and 110 will be changed from that appearing at terminals 76, and 108 respectively to the voltage appearing at terminals 74 and 106 respectively.

Light emitting diode 114 is photo-coupled to photo silicon controlled rectifier 120 which is connected diagonally across a conventional diode bridge 122 having diodes 124, 126, 128, and 130 connected in conventional manner in the legs thereof. The anode of rectifier 120 is connected to bridge terminal 132 and the cathode of rectifier 120 is connected to corner terminal 134 of bridge 122. The gate terminal 136 of rectifier 120 is connected through resistance 138 to corner terminal 134. Corner terminal 140 is connected to line 22 and corner terminal 142 is connected through resistance 144 to gate 146 of triac 28.

In the operation of the circuit shown, the conventional 120 volt AC source 20 is impressed between lines 22 and 24 providing a DC current through rectifier bridge 30 to motor 40. The connection between line 22 and bridge 30 is through triac 28, which is normally gated to an "on" condition. Assuming an overload condition in motor 40, which would draw a higher current than normal, which current could damage motor 40, the drive train, or structural members connected to the drive train, an increased voltage drop across resistance 26 will occur. Also, an increased negative charge will build on the plate of capacitor 54 connected to line 52 due to the presence of diode 56 in the circuit. When the voltage on line 52 and terminal 60 is more negative than terminal 62 of amplifier 58, the voltage at output 80 and line 82 becomes approximately the voltage on line 66, or −13 volts. If the overload condition continues for one second, the first plates of capacitances 84, 86, and 88 which are connected to line 82, will increase negatively to a potential of about −13 volts, which will cause the voltage at input terminal 98 of amplifier 96 to be more negative than that voltage at input terminal 100. The one second time constant is determined by the values of capacitances 86 and 88, and of resistances 92 and 94.

When the voltage on terminal 98 is more negative than the voltage on terminal 100, the output voltage at terminal 110 will switch from the voltage on line 78, which is approximately common potential, to the voltage on line 66, or approximately −13 volts. Diode 114 is normally conducting since its anode is normally at approximately common potential and its cathode is at approximately −1.1 to −1.2 volts. However, when the voltage at terminal 110 is changed to a −13 volts, diode 114 ceases to conduct.

As the voltage at terminal 110 increases negatively, diode 112 is caused to conduct since its cathode is at approximately −13 volts and its anode is at a higher positive voltage. Once diode 112 conducts, the voltage at terminal 98 is substantially tied to −13 volts, latching or holding amplifier 96 in its inverted state, maintaining the −13 volts at its output terminal 110. Due to the presence of resistance 94, the charge on the first plate of capacitor 88 connected to line 82 is restricted from discharging through terminals 80 and 76 of amplifier 58 thus preventing unlatching of amplifier 96.

The normally conducting light emitting diode 114 energizes photo silicon controlled rectifier 120 causing a voltage to be present at terminal 142 of bridge 122 and gate 146 to maintain triac 28 conductive. However, when the terminal 110 of amplifier 96 inverts from approximately ground voltage to −13 volts, diode 114 ceases to conduct, rectifier 120 ceases to conduct, and the positive voltage at terminal 142 is reduced, removing the gating signal to gate 146 of triac 28, breaking the power supply from source 20 to motor 40. Triac 28 will remain non conductive even though the overload condition is removed, due to the latching of amplifier 96 in its inverted state. Removing the −15 volts from line 66, which may be done by temporarily opening switch 73 will remove the latch and reset amplifier 96. When the voltage at terminal 106 rises, the voltge at terminal 110 and the cathode of diode 112 will rise, turning off diode 112 at which time the voltage on terminal 98 will rise to a value above that at terminal 100 so that the voltage at terminal 110 will be approximately that at terminal 108, again causing diode 114 to conduct as soon as the −15 volts is reestablished in line 66.

Due to the presence of diode 90, the charge on the first plates of capacitors 86 and 88 will be quickly discharged through terminal 80 and terminal 76 to line 78. This is advantageous since for any overload or transient less than one second, it is not desired that the power to motor 40 from supply 20 be removed. Diode 90 bypasses resistance 92 thereby providing quick discharge of the capacitors preventing a cumulative charge caused by transients or several closely spaced transitory overloads, no one of which would signal an overload condition for which the circuit was designed to operate. This prevents false or spurious overload signals, at even high frequencies, from actuating the circuit to interrupt the power to motor 40.

The switch 73 may alternatively be in the form of a photo-sensitive diode in a conventional photo-coupler as disclosed in my application Ser. No. 914,679, filed 6-12-78, entitled LOGIC CONTROL FOR POWER OPERATED DOOR, the circuit of the latter including a LED or a part of the photo-coupler which may be used in the circuit of this application.

In a satisfactory working embodiment, the following components and values were used it being understood that these are given as exemplary since others may be used without departing from the scope of this invention.

| Resistor 26 | .5 ohm 10 W |
|---|---|
| Resistor 50 | 10K ohm |
| Resistor 64 | 56K ohm |
| Resistor 70 | 3300 ohm |
| Resistor 92 | 20K ohm |
| Resistor 94 | 4700 ohm |
| Resistor 102 | 4700 ohm |
| Resistor 104 | 10K ohm |
| Resistor 116 | 1K ohm |
| Capacitor 54 | 10 mfd 25 V |
| Capacitor 84 | 10 mfd |
| Capacitor 86 | 10 mfd |
| Capacitor 88 | 10 mfd |
| Diodes 32, 34, 36, 58, 56, 90, 112, 124, 126, 128, 130 | PTC-205 Mallory 72-Siemans IN4744A 15V |

Zener diode LED 114 and SCR 120 are part of a photon coupler 4N40 manufactured by General Electric. The operational amplifiers 58 and 96 are a part of a dual package and therein the pins 4 thereof are connected together as are the pins 8. In the working embodiment, this package is a type LM-1458-N made by National Semiconductor.

While there have been described above the principles of this invention in connection with specific apparatus, it is to be clearly understood that this description is made only by way of example and not as a limitation to the scope of the invention.

What is claimed is:

1. A motor overload protection circuit comprising a first source of alternating voltage; a motor-energizing circuit including a motor and a semiconductor switch connected to said source, said switch having a gating element for determining the state of conductivity thereof, an overload-sensing resistor in series with said motor; a second source of unidirectional voltage; a first high gain switching circuit having input and output circuits and operable between first and second switching states which provide first and second switching voltages, respectively, in said output circuit, said second source being connected to said input circuit and normally biasing said switching circuit to said first state; said switching circuit including a first operational amplifier having inverting and non-inverting input elements which form a part of said input circuit and an output element which forms a part of said output circuit, one of said input elements being connected to said second source to bias said amplifier to the first state; rectifying circuit means connected across said resistor and to the other of said input elements for producing a unidirectional overload signal voltage which activates said amplifier from its first to its second switching voltage;

a second high gain switching circuit having input and output circuits and operable between third and fourth switching states which provide third and fourth switching voltages, respectively, in its output circuit, said second source being connected to the last-mentioned input circuit and normally biasing said second switching circuit to said third state; said second switching circuit including a second operational amplifier having inverting and non-inverting input elements which form a part of said last-mentioned input circuit and an output element which forms a part of the last-mentioned output circuit, one of said second input elements being connected to said second source to bias said second amplifier to the third state;

time delay charging circuit means coupled between the output circuit of said first switching circuit and the input circuit of said second switching circuit operative in response to said second switching voltage to activate said second switching circuit from its third to said fourth switching voltage state, said charging circuit means including two series resistors connected between said first output circuit and said second input circuit and two charging capacitors connected to respective ones of said series resistors which are charged by said second voltage through the circuit of said series resistors, said charging circuit means further including a discharging diode shunt connected across one of said series resistors and poled to discharge one of said capacitors into the output circuit of said first switching circuit when the latter is in its first state; latching circuit means including a latching diode connected between said output and input circuits of said second switching circuit, said latching diode being poled to couple said fourth voltage from the last-mentioned output circuit to the last-mentioned input circuits thereby to latch said second switching circuit into its fourth state, the other of said charging capacitors being connected to said last-mentioned input circuit; a control signal device connected to the last-mentioned output circuit and said second source and responsive to said third and fourth voltages, respectively, to generate first and second control signals, and means for coupling said first and second control signals to said gating element of said semiconductor switch of rendering the latter non-conductive in response to said second control signal and conductive in response to said first control signal.

2. The circuit of claim 1 wherein said rectifying circuit means includes a diode connected between the end of said resistor opposite to said first source and the other input element of said first amplifier, a filter capacitor connected between the other end of said resistor and the last-mentioned input element, and a resistor shunt connected across the last-mentioned capacitor.

3. The circuit of claim 1 wherein said semiconductor switch is a triac and said signal device includes a light-emitting diode which is energized in response to said third voltage and deenergized by said fourth voltage.

4. The circuit of claim 1 having a first voltage divider connected across said second source and at an intermediate point to said one input element of said first amplifier to provide said bias, a second voltage divider connected across said second source and at an intermediate point to said one input element of said second amplifier to provide the bias thereto; and circuit means including said first amplifier for discharging said one capacitor through said discharging diode and said first amplifier.

5. The circuit of claim 1 wherein said coupling means in a photon coupler, said semiconductor switch is a triac, and having a master control switch connected to said second source for selectively connecting and disconnecting the latter to and from the remaining circuitry.

* * * * *